(12) United States Patent
Watanabe

(10) Patent No.: US 8,654,165 B2
(45) Date of Patent: Feb. 18, 2014

(54) OPTICAL SCANNING DEVICE AND IMAGE FORMING APPARATUS

(75) Inventor: Naoto Watanabe, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/153,798

(22) Filed: Jun. 6, 2011

(65) Prior Publication Data
US 2011/0318057 A1 Dec. 29, 2011

(30) Foreign Application Priority Data

Jun. 23, 2010 (JP) ................................. 2010-142997
Jul. 9, 2010 (JP) ................................. 2010-156442

(51) Int. Cl.
B41J 2/435 (2006.01)
B41J 2/47 (2006.01)

(52) U.S. Cl.
USPC .......................................... 347/235; 347/250

(58) Field of Classification Search
USPC .......................... 347/229, 234, 235, 248–250
See application file for complete search history.

(56) References Cited

U.S. PATENT DOCUMENTS

| 6,700,596 | B2 | 3/2004 | Ishihara | |
| 6,721,262 | B1* | 4/2004 | Jordache et al. | 720/672 |
| 6,775,042 | B2* | 8/2004 | Ishihara | 359/204.1 |
| 7,545,547 | B2 | 6/2009 | Hayashi et al. | |
| 7,667,868 | B2 | 2/2010 | Hayashi et al. | |
| 7,687,762 | B2 | 3/2010 | Watanabe et al. | |
| 7,924,487 | B2 | 4/2011 | Miyatake et al. | |
| 2005/0052525 | A1* | 3/2005 | Ishibe | 347/235 |
| 2008/0055672 | A1 | 3/2008 | Watanabe et al. | |
| 2008/0123159 | A1 | 5/2008 | Hayashi et al. | |
| 2008/0204840 | A1 | 8/2008 | Watanabe et al. | |
| 2008/0218827 | A1 | 9/2008 | Watanabe et al. | |
| 2008/0285104 | A1 | 11/2008 | Arai et al. | |
| 2009/0314927 | A1 | 12/2009 | Tatsuno et al. | |
| 2010/0091083 | A1 | 4/2010 | Itami et al. | |
| 2010/0183337 | A1 | 7/2010 | Kubo et al. | |
| 2010/0195681 | A1* | 8/2010 | Tatsuno et al. | 372/24 |
| 2011/0134500 | A1 | 6/2011 | Miyatake et al. | |

FOREIGN PATENT DOCUMENTS

| JP | 10-48554 | 2/1998 | |
| JP | 2002-23085 | 1/2002 | |
| JP | 3768840 | 2/2006 | |
| JP | 2006-192633 | 7/2006 | |
| JP | 2008112041 A * | 5/2008 | G02B 26/10 |
| JP | 2008-145955 | 6/2008 | |
| JP | 2008-257169 | 10/2008 | |
| JP | 4568633 | 8/2010 | |

OTHER PUBLICATIONS

U.S. Appl. No. 13/041,761, filed Mar. 7, 2011, Watanabe, et al.
Office Action mailed Sep. 10, 2013, in Japanese Patent Application No. 2010-142997.

* cited by examiner

Primary Examiner — Hai C Pham
(74) Attorney, Agent, or Firm — Oblon, Spivak, McClelland, Maier & Neustadt, L.L.P.

(57) ABSTRACT

An optical scanning device includes: a light source that emits light rays; an aperture member that adjusts a diameter of the light rays; a deflector including a plurality of reflecting surfaces that deflect the light rays; a scanning optical system that guides a light ray, of the light rays incident on the deflector and deflected by the deflector so as to be subjected to scanning onto a to-be-scanned surface; and a synchronization detector that performs synchronization detection by using a light ray, of the light rays, reflected to the aperture from the deflector is provided.

23 Claims, 7 Drawing Sheets

FIG.5A  FIG.5B
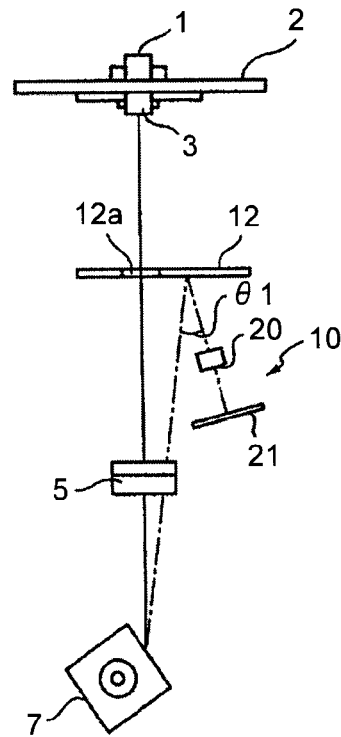
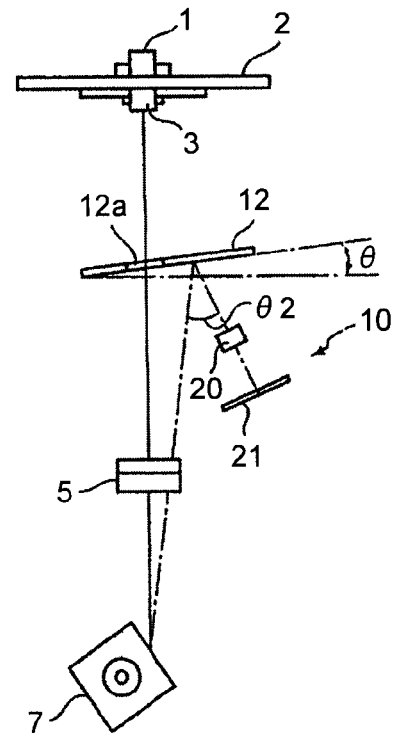
FIG.6
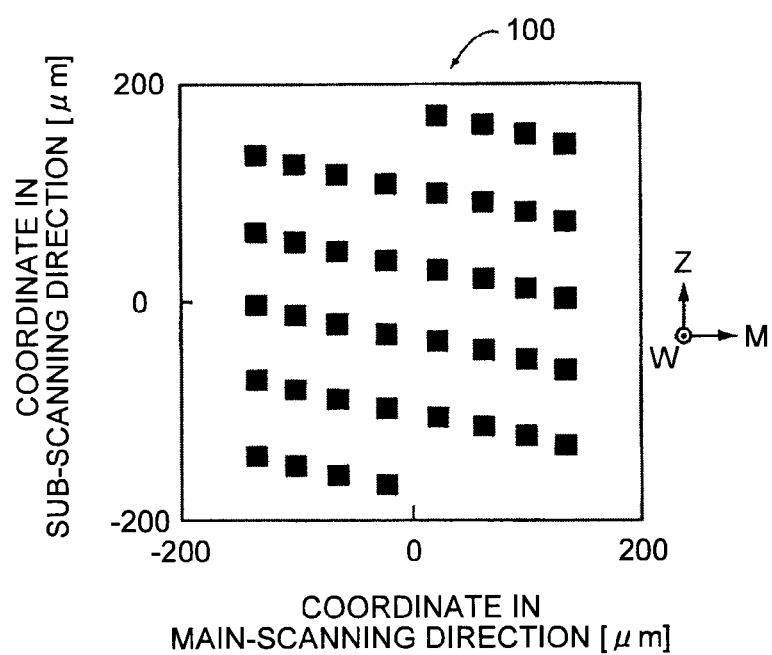

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2010-142997 filed in Japan on Jun. 23, 2010 and Japanese Patent Application No. 2010-156442 filed in Japan on Jul. 9, 2010.

BACKGROUND OF THE INVENTION

1. Field of the Invention

The present invention relates to an optical scanning device and an image forming apparatus, such as a copying machine, a facsimile machine, a plotter machine, or a multifunction peripheral including at least two of these machines, including the optical scanning device.

2. Description of the Related Art

Electrophotographic image forming apparatuses for use in a laser printing machine, a laser plotter machine, an ordinary-paper facsimile machine, and a multifunction peripheral providing at least two functions of these machines have become increasingly compact.

Under such circumstances, optical scanning devices having a wide angle of view and a short optical length from a photosensitive member have also been provided. For instance, optical scanning devices, in which a light ray (light beam) for use by a synchronization detector for synchronization detection does not pass through a scanning lens to achieve wider angle of view, have been proposed (see, for example, Japanese Patent No. 3768840 and Japanese Patent Application Laid-open No. H10-048554).

However, in the optical scanning device disclosed in Japanese Patent No. 3768840, an end portion of a scanning optical element is notched to allow passage of light rays for use in synchronization detection therethrough. Accordingly, when the angle of view for scanning increases, the synchronization light rays pass through a vicinity of the scanning optical element, which makes it difficult to separate scanning light rays from the synchronization light rays.

In the optical scanning device disclosed in Japanese Patent Application Laid-open No.H10-048554, a scanning optical element and an optical element for synchronization detection are independent from each other, which allows easy separation of scanning light rays from synchronization light rays. However, this technique requires an optical system for synchronization detection to be arranged in a small space between a light-supplying optical system and a scanning optical system, which are arranged between a light source and a deflector. Accordingly, the technique disclosed in Japanese Patent Application Laid-open No.H10-048554 is disadvantageous in that as the angle of view increases, configuring a layout of the optical systems becomes difficult.

With proliferation of high-speed image forming apparatuses capable of forming color images, tandem image forming apparatuses including a plurality of (typically four) photosensitive members have come into wide use. In such a tandem image forming apparatus, for instance, four photosensitive members are arranged along a transfer belt (or an intermediate transfer belt) that conveys a recording medium. After an electrostatic charging unit has electrostatically charged each of the photosensitive members, a latent image is formed on each of the photosensitive members by a writing unit. The latent images on the photosensitive members are individually developed with developing agents of different colors (for instance, with yellow, magenta, cyan, and black toners) into developed images. These developed images of different colors are transferred onto the recording medium (or the intermediate transfer belt) conveyed by the transfer belt such that the images are overlaid on one another, thereby forming a color image.

Examples of electrophotographic color image forming apparatuses include what is called as a one-drum-intermediate-transfer-type image forming apparatus that includes only a single photosensitive member. This type of image forming apparatus rotates the photosensitive member a number of colors turn to transfer images onto on an intermediate transfer member such that the images are overlaid on one another, thereby forming a color image on the intermediate transfer member, and thereafter transfers the images onto a recording medium. To form four-color images with such a one-drum image forming apparatus, it is necessary to rotate the photosensitive member four turns for each sheet of the color images. Accordingly, one-drum image forming apparatuses are inferior in productivity to tandem image forming apparatuses.

As discussed above, tandem image forming apparatuses are capable of high-speed image forming as compared with one-drum-intermediate-type transfer image forming apparatuses and therefore increasing productivity in color-image forming. However, a typical tandem image forming apparatus disadvantageously uses a plurality of light sources (for instance, generally four light sources are used in a tandem image forming apparatus that includes four photosensitive members) because optical writing on each of a plurality of photosensitive members is performed by a writing unit that uses optical scanning devices. This disadvantageously results in an increase in the number of components, misregistration due to different wavelengths of the plurality of light sources, an increase in production cost, and the like.

Deterioration of a semiconductor laser is one of typical causes of a failure of the writing unit. Accordingly, the larger the number of light sources, the probability of failure increases while recyclability decreases.

Under such a circumstance, a technique for not increasing the number of light sources of an optical scanning device for use in a tandem image forming apparatus is disclosed in, for example, Japanese Patent Application Laid-open No. 2002-023085. In this conventional technique, different to-be-scanned surfaces are scanned with light beams emitted from a single light source by using a pyramidal mirror or flat mirrors. However, this technique is still disadvantageous in that, although the number of light sources can be reduced, the number of deflecting mirror surfaces is limited to two at maximum, which can be a restriction on speedup.

An example of optical scanning devices configured to solve the problem discussed above is disclosed in Japanese Patent Application Laid-open No. 2006-284822. In this optical scanning device, a light ray emitted from a single light source is split by a beam splitter into two light rays that are away from each other in the sub-scanning direction. The light rays are deflected by a deflector including two polygon mirrors, which are stacked in an angularly-staggered arrangement and to be coaxially rotated, so as to scan two different to-be-scanned surfaces.

In this conventional technique, the two polygon mirrors stacked in the staggered arrangement in different phases are used as means that scans different to-be-scanned surfaces with light rays emitted from a single light source. However, this technique can increase production cost because such polygon mirrors stacked in the staggered arrangement in the different phases are not off-the-shelf items. Furthermore, this technique can cause degradation in image quality to occur because of involving processing of the polygon mirrors for causing an upper one and a lower one of the polygon mirrors to have different tilt surface angles and profile irregularities.

Another example of the optical scanning devices configured to solve the problem discussed above is disclosed in Japanese Patent Application Laid-open No. 2008-257169. In this optical scanning device, a light ray emitted from a single light source is split by a beam splitter into two light rays that are away from each other in the main-scanning direction. The two light rays are reflected from incident-light mirrors that cause the two light rays to impinge on a deflector having four reflecting surfaces in a manner that an angle between the two light rays incident on the deflector is 90 degrees. Hence, this configuration allows different to-be-scanned surfaces to be scanned with light beams emitted from the single light source. This conventional technique has solved the problem pertaining to the technique discussed above because a general-purpose polygon mirror having four reflecting surfaces can be used. However, in the configuration where the two light rays to impinge on the deflector with the 90-degree angle between the two incident light rays incident, an angle between each incident light beam and a center of a scan image relative to the deflector is restricted to approximately 45 degrees. When the angle of the incident beam is restricted to 45 degrees, an angle, between the center of a scanned image and an image end on the incident beam side, where image scanning can be performed is restricted to within 45 degrees. Put another way, the angle of view is undesirably narrowed. When, furthermore, synchronization detection for determining when to start image writing is performed at a position between the incident beam and the image end, the angle of view is further narrowed.

In recent years, widening the angle of view has been desired for compact design of writing units. A decrease in the angle of view is also a problem to be solved in the techniques discussed above.

SUMMARY OF THE INVENTION

It is an object of the present invention to at least partially solve the problems in the conventional technology.

According to an aspect of the present invention, there is provided an optical scanning device, including: a light source that emits light rays; an aperture member that adjusts a diameter of the light rays; a deflector including a plurality of reflecting surfaces; a scanning optical system that guides a light ray, of the light rays, incident on the deflector and deflected by the deflector to be subjected to scanning to a to-be-scanned surface; and a synchronization detector that performs synchronization detection by using a light ray, of the light rays, reflected to the aperture from the deflector.

According to another aspect of the present invention, there is provided an image forming apparatus for forming an image on a recording medium, the image forming apparatus including the optical scanning device mentioned-above, wherein the optical scanning device forms a latent image by illuminating an image carrier, the image carrier being the to-be-scanned surface, with the beams emitted from the light source, the latent image formed on the image carrier is developed with developing agent into a developed image, and the developed image is transferred onto the recording medium by any one of direct transfer and an indirect transfer via an intermediate transfer member. The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5A and FIG. 5B are explanatory diagram for illustrating an effect of tilting the aperture member in the main-scanning direction, FIG. 5A being a view of an arrangement where the aperture member is not tilted, FIG. 5B being a view of an arrangement where the aperture member is tilted;

FIG. 6 is an elevation view illustrating a light source of the optical scanning device according to a third example of the first embodiment;

DETAILED DESCRIPTION OF THE PREFERRED EMBODIMENTS

Exemplary embodiments of the present invention are described below with reference to the accompanying drawings.

First Example of the First Embodiment

Figure 1:
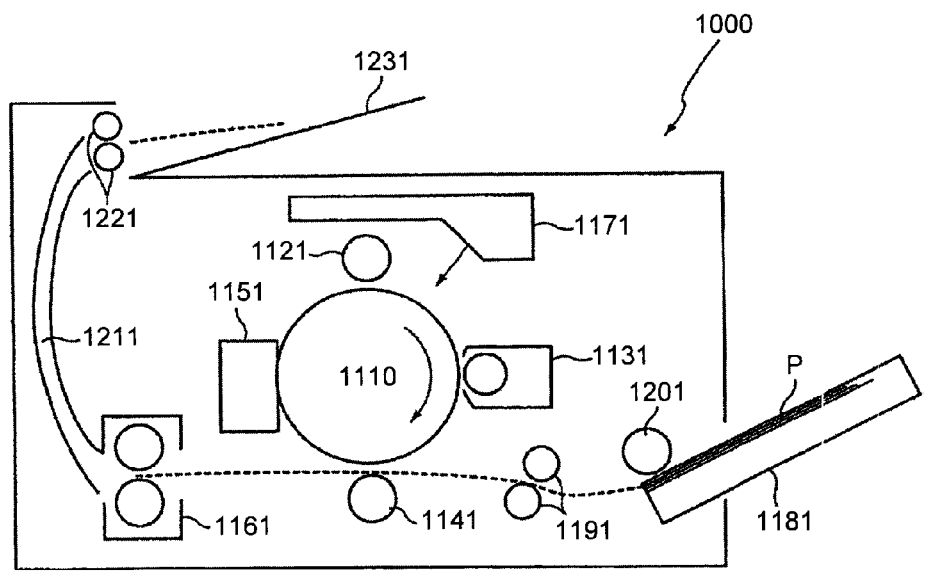
FIG. 1 is an explanatory diagram schematically illustrating a laser printer, which is an example of an image-forming apparatus according to a first embodiment of the present invention.

Overview of a configuration of a laser printer 1000, which is a first example of an image forming apparatus according to a first embodiment of the present invention, is described below with reference to FIG. 1. The laser printer 1000 includes a photoconductive, photosensitive member 1110 having a cylindrical shape and serving as an image carrier. An electrostatic charging roller 1121, which is an example of an electrostatic charging unit, a developing device 1131, a transfer roller 1141, and a cleaning device 1151 are arranged around the photosensitive member 1110. A corona charger can alternatively used as the electrostatic charging unit.

The laser printer 1000 further includes an optical scanning device 1171 that performs optical scanning with a laser beam LB so that exposure for optical writing is performed at a position between the electrostatic charging roller 1121 and the developing device 1131.

Image forming is performed as follows. The photosensitive member 1110 is rotated clockwise in FIG. 1 at a constant velocity. The surface of the photosensitive member 1110 is uniformly electrostatically charged by the electrostatic charging roller 1121 and then illuminated for exposure for the optical writing with the laser beam LB by the optical scanning device 1171. As a result, an electrostatic latent image is formed on the surface.

The thus-formed electrostatic latent image is what is called a negative latent image, of which image portion has been exposed. The developing device 1131 develops the electrostatic latent image in a flipping manner, thereby forming a toner image on the photosensitive member 1110.

A paper cassette 1181 that houses transfer paper P, which is an example of a recording medium, is detachably mounted on a main body of the laser printer 1000. In the mounted state illustrated in FIG. 1, an uppermost sheet of the housed transfer paper P is picked up by a sheet feeding roller 1201. A leading end of the picked-up transfer paper P is pinched between a pair of registration rollers 1191.

The pair of registration rollers 1191 conveys the transfer paper P into a transfer unit timed to coincide with arrival of the toner image on the photosensitive member 1110 at a transfer position.

At the transfer unit, the toner image is placed on the transfer paper P conveyed into the transfer unit. The toner image is then transferred onto the transfer paper P by the transfer roller 1141.

The transfer paper P, onto which the toner image has been transferred, is conveyed to a fixing device 1161, in which the toner image is fixed. The transfer paper P is conveyed via a conveying path 1211 and delivered onto a tray 1231 by a pair of paper delivery rollers 1221.

After the toner image has been transferred from the photosensitive member 1110 to the transfer paper P, the surface of the photosensitive member 1110 is cleaned by the cleaning device 1151 to remove residual toner, paper powder, and the like from the surface.

Figure 2:
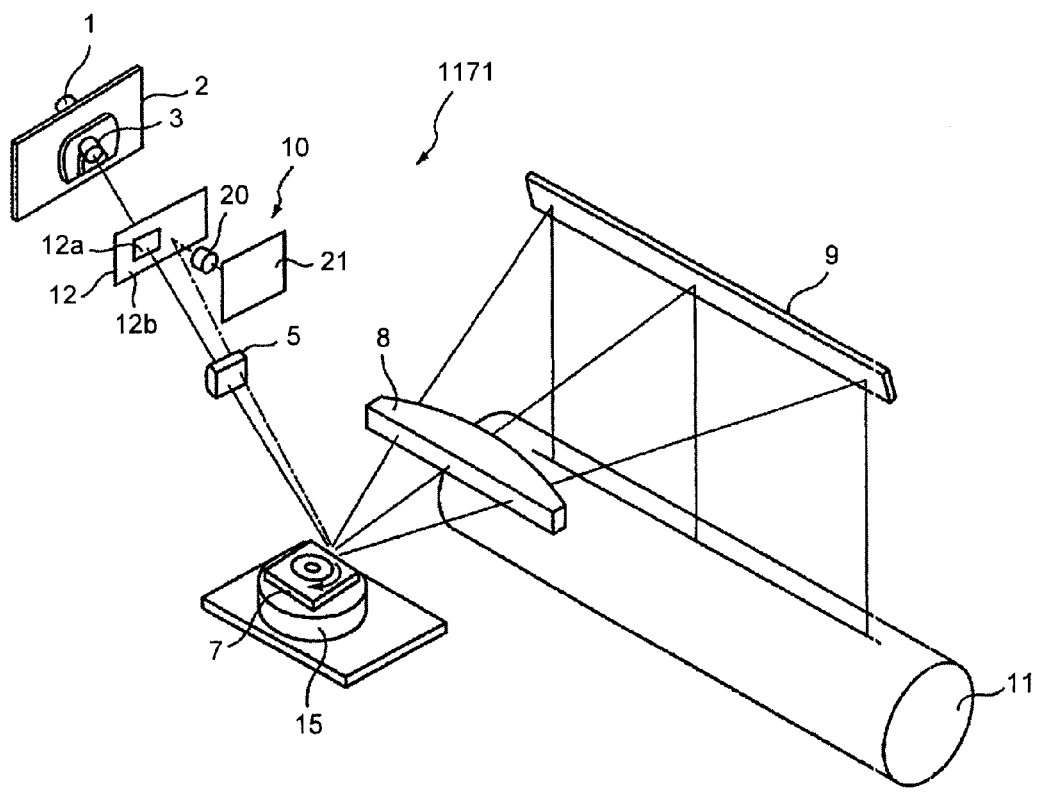
FIG. 2 is a perspective view schematically illustrating a configuration of an optical scanning device according to a first example of the first embodiment.

FIG. 2 is a diagram illustrating the optical scanning device 1171 in detail.

Reference numeral 1 in FIG. 2 denotes a semiconductor laser, which is an example of a light source, that Ls soldered onto a substrate 2. Reference numeral 3 denotes a coupling lens; 5 denotes a cylindrical lens; 7 denotes a polygon mirror, which is an example of a deflecting unit (polygon-mirror deflector); 8 denotes a scanning lens; 9 denotes a light redirecting mirror; 10 denotes a synchronization detecting unit; 11 denotes a photosensitive member, which is an example of a to-be-scanned surface; 12 denotes an aperture member.

The synchronization detecting unit 10 includes a condensing lens 20 and a synchronization detector plate 21.

In the first embodiment, a direction along a rotation axis of the polygon mirror 7 is assumed as the sub-scanning direction, while a direction perpendicular to the sub-scanning direction and to the optical axis is assumed as the main-scanning direction.

A diverging light ray emitted from the semiconductor laser 1 is converted through the coupling lens 3 into any one of a converging light ray with low convergence, a parallel light ray, and a diverging light ray with low divergence. The light beam exited the coupling lens 3 then passes through the aperture member 12, which is provided for adjusting a beam diameter on the to-be-scanned surface, and impinges on the cylindrical lens 5. The light beam is condensed in the sub-scanning direction through the cylindrical lens 5, thereby forming a line image, which is elongated in the main-scanning direction, at a position near a deflective reflecting surface on the polygon mirror 7.

A light beam supplied from the light source side exits the polygon mirror 7 toward a scanning optical system.

The polygon mirror 7 is configured to be rotated by a drive motor 15 in a rotating direction (clockwise) illustrated in FIG. 2 about the rotation axis.

The scanning lens 8 and the light redirecting mirror 9 guide a light beam deflected by the polygon mirror 7 to the photosensitive member 11, thereby causing an optical spot to be formed. In the first embodiment, it is assumed that the polygon mirror 7 is rotated clockwise to scan the photosensitive member 11 from a deep side toward a near side of the paper plane of FIG. 2.

A synchronization detection method according to the first embodiment is described below.

In the first embodiment, synchronization detection is performed by using a light beam reflected from the polygon mirror 7 toward the light source. The aperture member 12 has an opening 12*a*, through which light beams are to pass, and includes a frame 12*b* that serves as an aperture main body that supports the opening 12*a*.

The frame 12*b* is formed of an aluminum plate having a high reflectance or the like. The surface (front surface) of the aperture member 12 facing the light source is matte-black finished so as not to reflect an incident beam incoming from the light source side.

If an incident beam is reflected from the aperture member 12 to the light source side while optical scanning on the photosensitive member 11 is performed, the reflected light acts as a noise that disadvantageously changes the amount of light incident on the photosensitive member 11. Meanwhile, the other surface (back surface) of the aperture member 12 facing the polygon mirror 7 is not matte-black finished; accordingly, a light beam incoming from the polygon mirror 7 side is reflected by the back surface.

In other words, the aperture member 12 is configured to satisfy the following condition about reflectance: (reflectance of the surface facing the light source)<(reflectance of the surface facing the polygon mirror 7).

This condition can also be satisfied by forming the aperture member 12 with an anti-reflection member and applying reflective coating onto the back surface (facing the polygon mirror 7) of the aperture member 12.

Synchronization detection is performed in a state where, before the optical writing with the scanning lens 8 is performed, the polygon mirror 7 has been rotated only by one degree after the polygon mirror 7 has reflected synchronization light to the light source. The synchronization light reflected from the polygon mirror 7 passes through the cylindrical lens 5 and impinges on the aperture member 12 to be reflected by an outer frame portion (portion, which is near the scanning lens, where the opening 12*a* in the frame 12*b* is not defined) of the aperture member 12. The reflected synchronization light passes through the condensing lens 20 and reaches the synchronization detector plate 21.

Figure 3A:
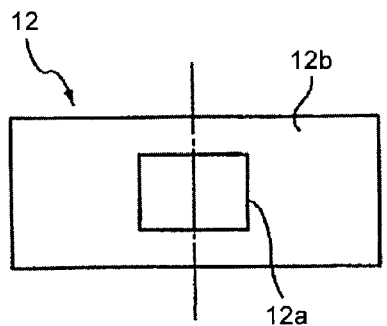
FIG. 3A is a front view of an example of a conventional aperture member.
Figure 3B:
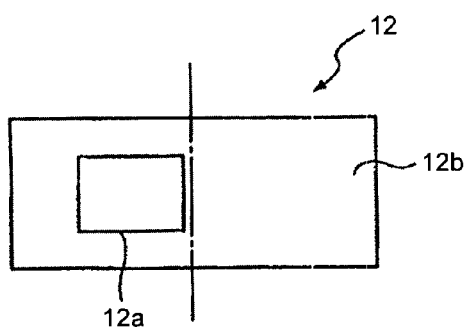
FIG. 3B is a front view of an aperture member according to the first embodiment.

As illustrated in FIG. 3B, the frame 12*b* of the aperture member 12 according to the first embodiment has such a shape that a width, in the main-scanning direction, of a portion corresponding to the synchronization detecting unit 10 is large more than width of other parts. More specifically, as illustrated in FIG. 3A, unlike a conventional aperture member where the opening 12*a* is at a center of the frame 12*b*, the frame 12b of the first embodiment is asymmetrical such that the opening 12a is located on one side in the main-scanning direction relative to an alternate long and short dash line extending approximately perpendicularly through a center, which is the center in the main-scanning direction, of the aperture member.

Put another way, the width, in the main-scanning direction, of the frame 12b of the aperture member 12 is large only on the scanning lens 8 side. This configuration allows a light beam to be reliably reflected to the synchronization detector plate 21.

Hence, the aperture member 12 provides both a function of adjusting a diameter of light rays emitted from the light source and a function as a reflecting surface for synchronization detection light.

By configuring the portion, of the frame 12b, on the side away from the scanning lens 8 short, space saving can be achieved, which leads to compact design of the optical scanning device.

When the configuration discussed above is employed, synchronization detection is performed at a position away from the scanning lens 8 in terms of layout. Accordingly, even when the angle of view for scanning is relatively large, interference between the scanning lens 8 and the synchronization detector plate 21 is less likely to occur. Furthermore, by virtue of shared use of the aperture member 12 by a light-supplying optical system and a synchronization optical system, the degree of freedom of layout in this configuration is increased as compared to that in a configuration, in which a completely-independent synchronization optical system is arranged between a light-supplying optical system and a scanning optical system. Accordingly, the optical scanning device can be constructed compact.

In the first embodiment, the synchronization detection is performed when the polygon mirror 7 has been rotation toward the scanning lens 8 from a time when a light beam reflected from the polygon mirror 7 has returned to the light source. Alternatively, the synchronization detection can be performed before the light beam has returned to the light source.

Thus, a higher degree of freedom of layout can be attained on the side where scanning starts because the synchronization detection can be performed at a position away from the scanning lens, which is near the light source. Accordingly, the angle of view of the scanning lens is widened, and the writing unit can be constructed compact.

Second Example of the First Embodiment

A second example of the first embodiment is described below with reference to FIGS. 4 to 5B. Note that elements identical to those of the first example of the first embodiment discussed above are denoted by like reference numerals. Only relevant portions are described below, and repeated descriptions about configurations and functions that have already been discussed are omitted unless otherwise particularly required (the same goes for other embodiments and examples to be discussed below).

Figure 4:
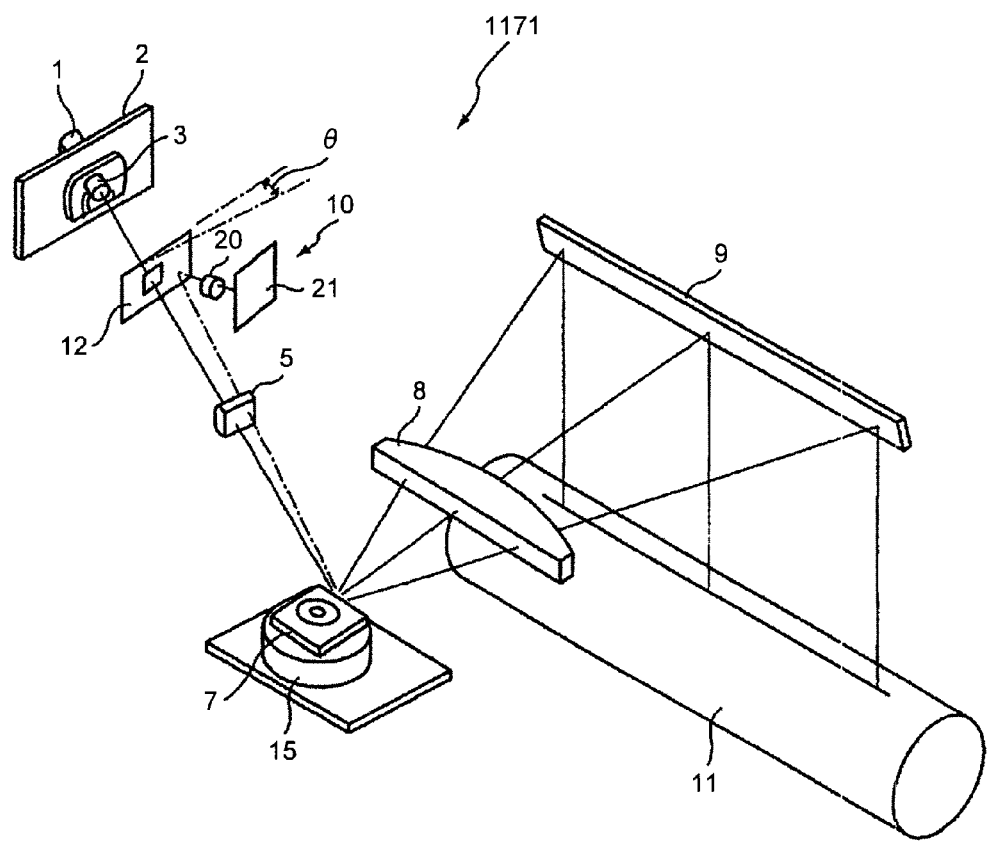
FIG. 4 is a perspective view schematically illustrating a configuration of the optical scanning device according to a second example of the first embodiment.

In the second example of the first embodiment, the aperture member 12 is tilted in the main-scanning direction as illustrated in FIG. 4. More specifically, whereas the aperture member 12 in the first example of the first embodiment is situated substantially parallel to the substrate 2 where the light source is provided, the aperture member 12 of the second example of the first embodiment is at an angle θ in the main-scanning direction with respect to the substrate 2.

Put another way, the aperture member 12 is tilted in the main-scanning direction with respect to a direction perpendicular to the optical axis such that the portion corresponding to the synchronization detecting unit 10 is away from the synchronization detecting unit 10.

When such an arrangement as discussed above is employed, as illustrated in FIG. 5B, separating a light beam emitted from the semiconductor laser (light source) 1 from a light beam, which has returned to the aperture member 12 to be used in the synchronization detection, can be performed easily because an angle difference therebetween increases (θ1<θ2). This increase in angle difference is also advantageous in that the degree of freedom of layout increases because the need of arranging the synchronization detector plate 21 near the cylindrical lens 5 is eliminated.

Third Example of the First Embodiment

FIG. 6 illustrates a third example of the first embodiment.

A feature of the third example is that a surface-emitting laser is used as the light source. When the surface-emitting laser is used as the light source, two-dimensional integration of light sources can be performed easily, and hence a larger number of light beams can be used. This leads to high-intensity, high-speed writing.

An example surface-emitting laser is depicted in FIG. 6. The light source includes a two-dimensional array 100 that is formed by, for instance, as illustrated in FIG. 6, two-dimensionally arranging 40 light-emitting elements on a single substrate. The 40 light-emitting elements are arranged such that orthogonal projections of all the light-emitting elements on a virtual line extending in the sub-scanning direction (in this example, along the z-axis) are at regular intervals. Meanwhile, a "light-emitting-element interval" denotes a center-to-center spacing between two light-emitting elements.

Each of the light-emitting elements is a vertical-cavity surface-emitting laser of which oscillation wavelength is 780 nm. In other words, the two-dimensional array 100 is a surface-emitting laser array including the 40 light-emitting elements.

The light rays emitted from the light-emitting elements are linearly polarized parallel to the sub-scanning direction. A diverging angle (of FFP: Far Field Pattern) of the light rays emitted from the light-emitting elements in a steady state (state where optical output is stabilized) is seven degrees in each of the main-scanning direction and the sub-scanning direction.

The light source is arranged so as to emit light rays in a direction of arrow W.

Second Embodiment

Figure 7:
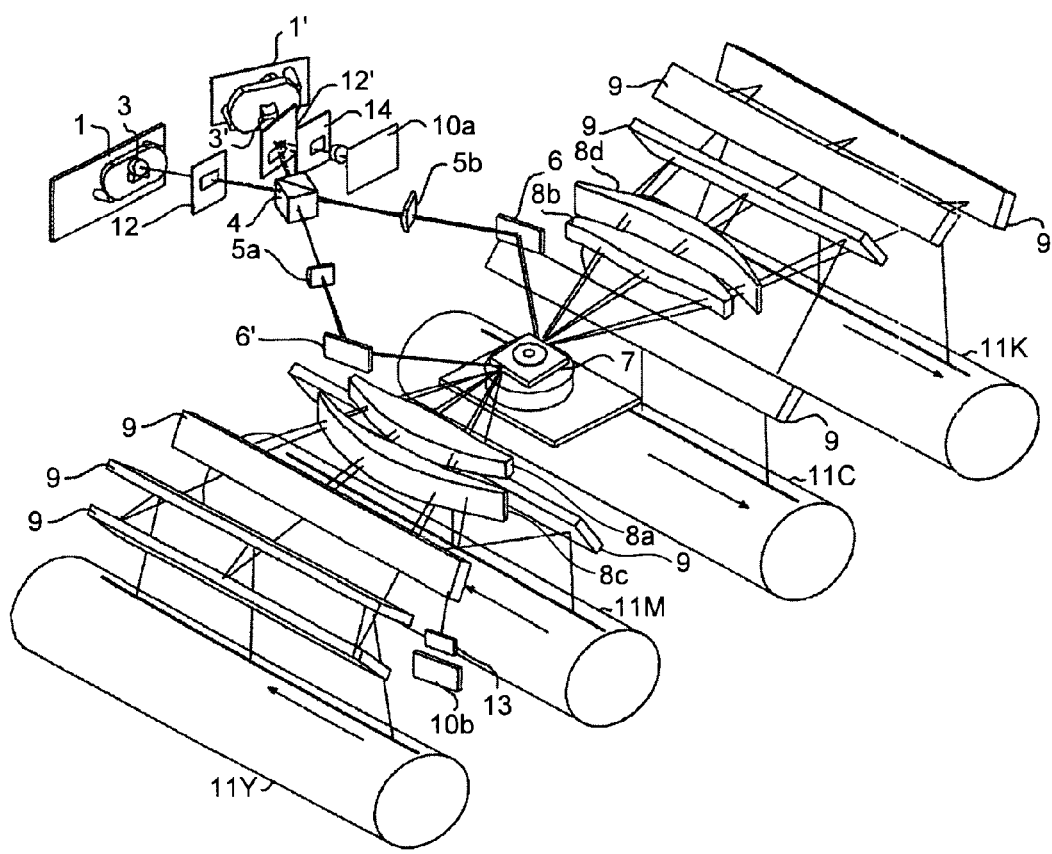
FIG. 7 is a perspective view schematically illustrating a configuration of an optical scanning device according to a second embodiment of the present invention.
Figure 8:
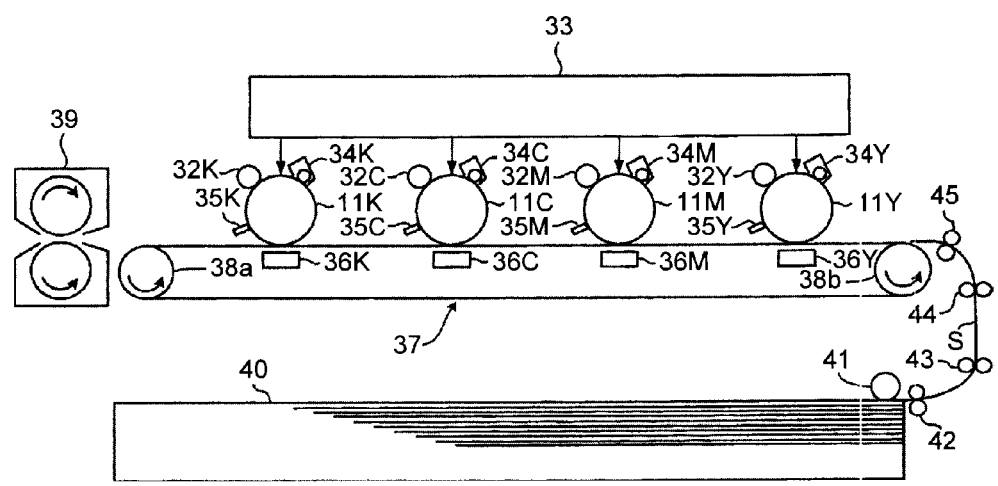
FIG. 8 is an explanatory diagram schematically illustrating a configuration of a multi-color image forming apparatus that uses the optical scanning device illustrated in FIG. 7 in a writing unit.

FIG. 7 is a perspective view schematically illustrating a configuration of an optical scanning device according to a second embodiment of the present invention. FIG. 8 is an explanatory diagram schematically illustrating a configuration of a multi-color image forming apparatus that includes, in a writing unit, the optical scanning device illustrated in FIG. 7.

The multi-color image forming apparatus illustrated in FIG. 8 is described below. In FIG. 8, each of reference symbols Y, M, C, and K represents a color of a yellow (Y) image, a magenta (M) image, a cyan (C) image, and a black (K) image. The reference symbols are omitted in the following discussions except for a situation where the omission is inappropriate.

In FIG. 8, reference numeral 11 denotes a photosensitive member, which is an example of an image carrier; 32 denotes an electrostatic charger that electrostatically charges the photosensitive member; 33 denotes a writing unit including the optical scanning device that performs exposure by illuminating the electrostatically-charged photosensitive members with beams modulated according to image signals to thereby form an electrostatic latent image on each of the photosensitive members; 34 denotes a developing unit that develops the latent image on the photosensitive member with toner of a corresponding color to produce a toner image; 35 denotes a cleaning unit that removes residual toner on the photosensitive member; 36 denotes a transfer-electrostatic-charging unit that transfers the toner image on the photosensitive member onto a recording medium; 37 denotes a transfer belt that carries and conveys the recording medium; 38a and 38b denote a drive roller and a driven roller, respectively, on and around which the transfer belt is supported in a tensioned manner; 39 denotes a fixing unit that fixes the image transferred onto the recording medium; 40 denotes a paper feed cassette that houses sheets of a recording medium (for instance, recording paper); 41 denotes a paper feed roller that picks up the recording medium; 42 denotes separation rollers that separate the recording medium picked up by the paper feed roller into individual sheets; 43 and 44 denote conveying rollers that convey the recording medium; 45 denotes registration rollers that feed the recording medium onto the transfer belt 37 timed to coincide with image forming on the photosensitive members.

Photosensitive members 11Y, 11M, 11C, and 11K are arranged along the transfer belt 37 and each rotated clockwise in FIG. 8. Corresponding ones of electrostatic chargers 32Y, 32M, 32C, and 32K, developing units 34Y, 34M, 34C, and 34K, transfer-electrostatic-charging units 36Y, 36M, 36C, and 36K, and cleaning units 35Y, 35M, 35C, and 35K are arranged along the rotating direction.

Each of the electrostatic chargers 32Y, 32M, 32C, and 32K belongs to an electrostatic charging device that uniformly electrostatically charges a surface of the corresponding photosensitive member. As the electrostatic charger, a contact-electrostatic charging member, such as a charging roller or a charging brush, or a contactless electrostatic charger can be used. The writing unit (the optical scanning device to be described later) 33 illuminates the surfaces of the photosensitive members at positions between the electrostatic chargers 32Y, 32M, 32C, and 32K and the developing units 34Y, 34M, 34C, and 34K with beams, thereby forming electrostatic latent images on the photosensitive members 11Y, 11M, 11C, and 11K. The developing units 34Y, 34M, 34C, and 34K develop the electrostatic latent images, thereby forming Y-, M-, C-, and K-toner images on the surfaces of the photosensitive members. Subsequently, the transfer-electrostatic-charging units 36Y, 36M, 36C, and 36K sequentially transfer the toner images onto a recording medium S conveyed by the transfer belt 37, causing the toner images to be overlaid on one another. Thereafter, the fixing unit 39 fixes the images onto the recording medium S to complete image forming.

The optical scanning device according to the second embodiment to be used in the writing unit 33 of the image forming apparatus illustrated in FIG. 8 is described below with reference to FIG. 7.

Reference numeral 1, 1' in FIG. 7 denotes a semiconductor laser serving as the light source. Although the semiconductor lasers are at hidden positions in FIG. 7, each semiconductor laser is soldered onto a substrate. The semiconductor laser can be an edge-emitting type or a surface-emitting type multi-beam semiconductor laser. Reference numeral 3, 3' denotes a coupling lens; 4 denotes a half-mirror prism which is an example of a beam splitter; 5a, 5b denotes a cylindrical lens; 7 denotes a polygon mirror having four reflecting surfaces and being an example of a deflecting unit; 8a, 8b, 8c, 8d denotes a scanning lens; 9 denotes light redirecting mirrors; 11Y, 11M, 11C, 11K denotes a photosensitive member, which is an example of an image carrier serving as a to-be-scanned surface (Refer to FIG. 8). Reference numeral 12, 12' denotes an aperture member.

In the second embodiment, the direction along the rotation axis of the polygon mirror 7 is assumed as the sub-scanning direction, while the direction perpendicular to the sub-scanning direction and to the optical axis and that is parallel to the shaft of the photosensitive member 11 is assumed as the main-scanning direction.

Each of two diverging light rays emitted from the semiconductor laser (light source) 1, 1' are converted through the coupling lens 3, 3' into any ones of beam-like converging light rays with low convergence, parallel light rays, and diverging light rays with low divergence. The beam-like light rays (also referred to as "light beams") exited the coupling lens 3, 3' then pass through the aperture member 12, 12', through which a beam diameter on the to-be-scanned surface is adjusted, and enter the half-mirror prism 4. The aperture member 12, 12', which is formed of an aluminum plate having a high reflectance, has a rectangular opening (aperture portion), through which light beams pass, and a frame-like light shield surrounding the opening. The surface of the light shield facing the light source is matte-black finished so as not to reflect incoming light from the light source side. This is because, if an incident beam is reflected from the aperture member 12, 12' to the light source side while optical scanning on the photosensitive member 11 is performed, the reflected light beam acts as a noise that changes the amount of light incident on the photosensitive member 11, which is disadvantageous. Meanwhile, the other surface of the light shield of the aperture member 12, 12' facing the polygon mirror 7 is not matte-black finished but configured as a reflecting surface so that a light beam traveling from the polygon mirror 7 side and incident thereon is reflected by the other surface. In other words, the aperture member 12, 12' is configured to satisfy the following condition: (surface reflectance of the surface facing the light source)<(surface reflectance of the surface facing the deflector).

The optical scanning device of the second embodiment includes a light-supplying optical system. The light-supplying optical system includes, at a position between the aperture member 12, 12' and the polygon mirror 7, the half-mirror prism 4 serving as the beam splitter that splits a light ray into two light rays directed in different directions, and incident-light mirrors 6 and 6' that cause the two light rays, resultant of splitting by the half-mirror prism 4, to impinge on the polygon mirror 7 obliquely relative to the rotation axis of the polygon mirror 7 in a manner that an angle between the incident light rays on the polygon mirror 7 is approximately $\pi/2$.

Each of the light beams emitted from the single semiconductor laser (light source) 1, 1' and incident on the half-mirror prism 4 is split into two light beams by a half mirror in the prism. Therefore, the number of light beams that exit the half-mirror prism 4 is four in total. With this configuration, the half-mirror prism 4 can be used in a shared manner because the angle between the light rays emitted from the semiconductor laser 1, 1' differs from an angle at the half mirror by $\pi/2$, and the half-mirror prism 4 splits the two light beams that differ from each other in the sub-scanning direction into four light beams.

These four light beams enter the cylindrical lenses 5a and 5b to be condensed in the sub-scanning direction therethrough, thereby forming a "line image elongated in the main-scanning direction" at a position near a deflective reflecting surface on the polygon mirror 7. Meanwhile, the incident beams exited the cylindrical lenses 5a and 5b are reflected from the incident-light mirrors 6 and 6' arranged upstream from the polygon mirror 7 so as to impinge on the polygon mirror 7 obliquely relative to the rotation axis of the polygon mirror 7.

The polygon mirror 7 is configured to be rotated by a drive motor clockwise in FIG. 7 about the rotation axis.

The four light beams from the semiconductor lasers 1 and 1' side are deflected by the polygon mirror 7 to be subjected to scanning, and exit the polygon mirror 7 to the scanning optical system side.

Meanwhile, the reference numeral and symbol 8a, 8b, 8c, 8d denotes the scanning lens; 9 denotes the light redirecting mirror; 11Y, 11M, 11C, 11K denotes the image carrier (photoconductive, photosensitive member) serving as the to-be-scanned surface. In the specific example of the image forming apparatus illustrated in FIG. 8, 11Y denotes the photosensitive member for yellow, 11M denotes the photosensitive member for magenta, 11C denotes the photosensitive member for cyan, and 11K denotes the photosensitive member for black.

The scanning lenses 8a and 8c and the light redirecting mirrors 9 guide the two light beams deflected by the polygon mirror 7 to the corresponding photosensitive members 11Y and 11M, thereby forming optical spots. The light beams obliquely impinge on the polygon mirror 7 relative to the rotation axis. Accordingly, the two light beams reflected from the polygon mirror 7 are separated by the scanning lenses 8a and 8c in the sub-scanning direction and then separated by the light redirecting mirrors 9 in the sub-scanning direction so that each of the light beams is guided to a corresponding one of the photosensitive members 11Y and 11M. Similarly, the two light beams on the opposite side relative to the polygon mirror 7 are also separated in the sub-scanning direction and individually guided to the photosensitive members 11C and 11K.

In the second embodiment, the polygon mirror 7 is configured to be rotated by the drive motor clockwise about the rotation axis. The photosensitive members 11Y and 11M on a first side relative to the polygon mirror 7 are scanned with scanning beams traversing in the main-scanning direction toward the light source, while the photosensitive members 11C and 11K on a second side, which is on the opposite side relative to the polygon mirror 7, are scanned with scanning beams traversing in the main-scanning direction away from the light source. Accordingly, of synchronization detectors (synchronization detector plates 10a and 10b, which will be described later), the one synchronization detector plate 10a is arranged on the light source side while the other synchronization detector plate 10b is arranged on the side away from the light source.

Figure 9:
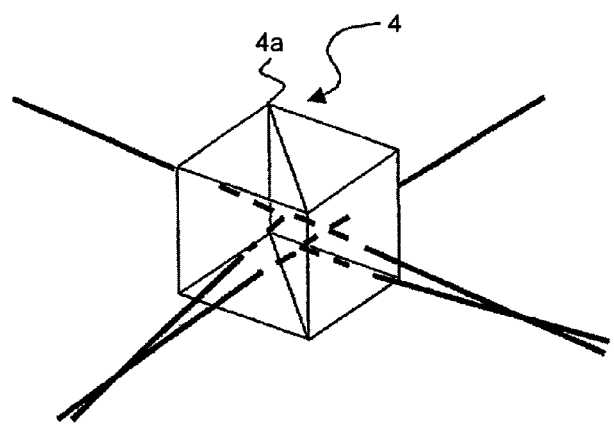
FIG. 9 is an explanatory enlarged view of a half-mirror prism serving as a beam splitter of the second embodiment.

FIG. 9 is an explanatory enlarged view of the half-mirror prism, serving as the beam splitter of the second embodiment.

The half-mirror prism 4, serving as the beam splitter, includes a half mirror 4a (splitting surface) and splits light into transmitted light and reflected light in a ratio of 1:1. The splitting ratio of the half mirror 4a is not limited to be 1:1; as a matter of course, the ratio can be changed depending on other optical system factors.

The angle between the light rays emitted from the semiconductor lasers (light sources) 1 and 1' is π/2. Accordingly, as illustrated in FIG. 9, the single half-mirror prism 4 can be used in a shared manner to split light rays emitted from the two light sources.

FIGS. 10A to 10D are explanatory diagrams illustrating how optical scanning is performed with split light beams.

Figure 10A:
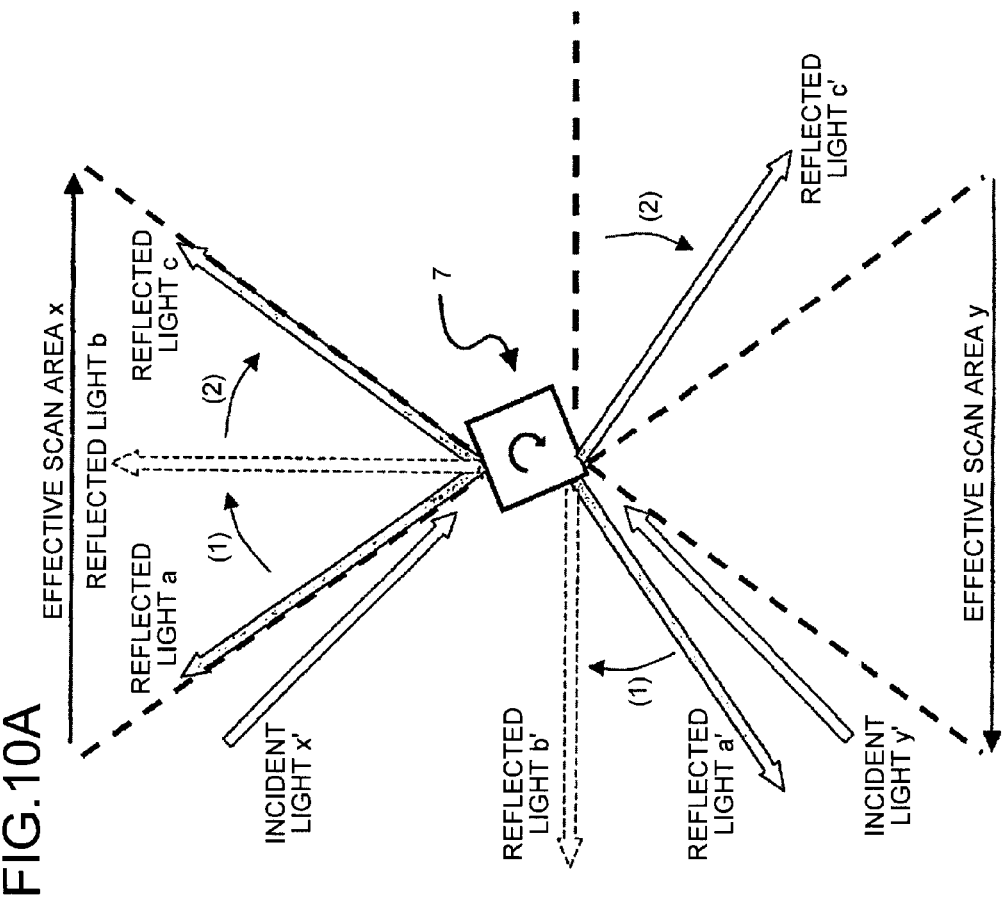
FIGS. 10A to 10D are explanatory diagrams illustrating how optical scanning is performed with split light beams.

As illustrated in FIG. 10A, a configuration where incident light beams (incident light x' and incident light y' of FIG. 10A) emitted from the same light source and split by the half-mirror prism 4 are reflected from the incident-light mirrors 6 and 6', which are illustrated in FIG. 7, that adjust optical paths of the light beams, thereby causing the light beams to impinge on different surfaces of the polygon mirror 7 (that includes four deflective reflections surfaces in the illustrated example) is employed. The angle (phase difference) between the incidents light beams 90 degrees (π/2). So long as the angle (phase difference) between the incident light beams is approximately 90 degrees (π/2), light rays, resultant of the splitting, do not scan an effective scan area simultaneously.

Behavior of lower-side reflected light of FIG. 10A in a period when an upper-side effective scan area x is scanned (by shifting reflected light to a reflected light b and then to reflected light c) is described below as an example.

Figure 10B:
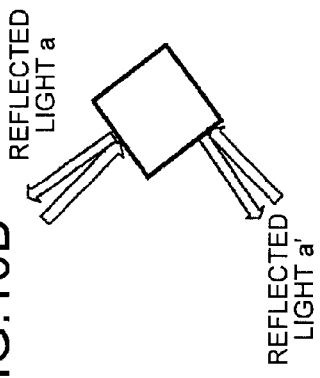
Figure 10C:
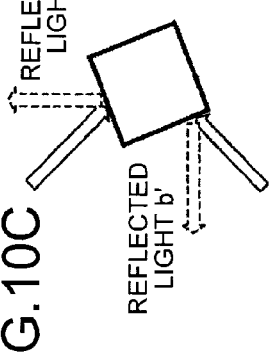

In a situation where the upper-side incident light x' is reflected to become the reflected light a, as illustrated in FIG. 10B, lower-side reflected light a' does not enter an effective scan area y because an angle between the incident light x' and the incident light y' is 90 degrees. When the polygon mirror 7 has been rotated to a position where the upper-side incident light is reflected to become the reflected light b, as illustrated in FIG. 10C, lower-side reflected light b' does not enter the effective scan area y. Also when the polygon mirror 7 is further rotated to a position where the upper-side incident light is reflected to become the reflected c, as illustrated in FIG. 10D, lower-side reflected light c' does not enter the effective scan area y.

Figure 10D:
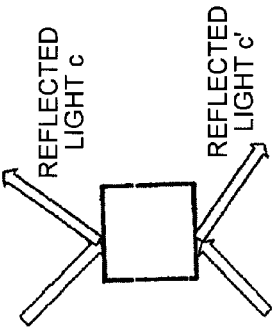

Put another way, throughout FIG. 10B, FIG. 10C, and FIG. 10D, the lower-side reflected light does not enter the effective scan area y. This relationship holds because the angle between the upper-side reflected light and the lower-side reflected light is maintained at 90 degrees; this is because the angle between the incident light x' and the incident light y' is 90 degrees and the number of reflecting surfaces on the polygon mirror 7, being the deflector, is four.

From the relation discussed above, it will be obvious that a relationship that the lower-side incident light does not scan the surface of a corresponding photosensitive member but scans outside the lower-side effective scan area y in a period when the upper-side incident light (incident light x') is scanning the upper-side effective scan area x still holds even when the angle between the incident light beams slightly deviates from 90 degrees. It will be also obvious from the vertically-symmetric arrangement that, in a period when the lower-side incident light is scanning the lower-side effective scan area y, the upper-side incident light does not scan the surface of a corresponding photosensitive member but scans outside the upper-side effective scan area x.

Modulation drive control of the semiconductor laser 1 is performed as follows. In the period when the upper-side incident light is scanning the upper-side effective scan area x, modulation drive control of the light source is performed according to image information for a corresponding color (e.g., black). In the period when the lower-side incident light is scanning the lower-side effective scan area y, modulation drive control of the light source is performed according to image information for a corresponding color (e.g., yellow). This allows image scanning for two colors to be performed by using the single semiconductor laser 1.

The same goes for the semiconductor laser 1'; accordingly, image scanning for two colors, or magenta and cyan, can be performed by using the single semiconductor laser 1'.

Figure 11:
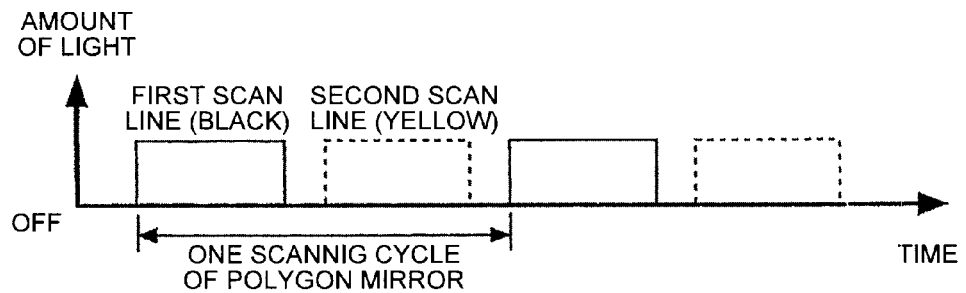
FIG. 11 is a timing diagram for exposure for multiple colors.

FIG. 11 is a timing diagram for exposure for multiple colors. In FIG. 11, the vertical axis represents the amount of light and the horizontal axis represents time.

FIG. 11 is the timing diagram for the single semiconductor laser (light source) 1 that performs exposure for first scan line (black) and second scan line (yellow) in a manner of illuminating all across the effective scan area for each of black and yellow (one scanning cycle of polygon mirror). The solid lines indicate exposure for black; the dotted lines indicate exposure for yellow. When to start writing for black or yellow is determined based on a result of detection of scanning beams by a synchronization detector provided at a scan-starting point, which is outside an effective scan area. Although the synchronization detector is not depicted in FIG. 11, a synchronization detection sensor that typically includes a photodiode or the like is used as the synchronization detector. The synchronization detector is provided on the synchronization detector plate 10a, 10b.

Figure 12:
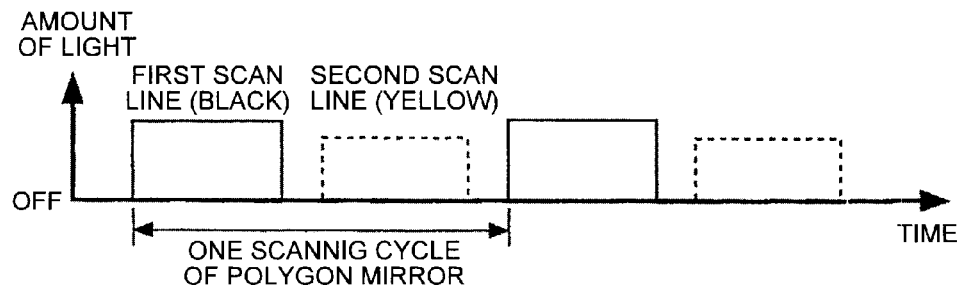
FIG. 12 is a timing diagram for exposure, in which amounts of exposure light vary on a color-by-color basis.

FIG. 12 is a timing diagram for exposure, in which amounts of exposure light vary on a color-by-color basis.

The amount of light for black and that for yellow are equal to each other in the example illustrated in FIG. 11; however, in an actual situation, there is relative difference in transmittance and reflectance between optical elements. Accordingly, when an equal amount of light is emitted from the light source, light amounts of beams reaching the photosensitive members undesirably vary. By setting the amounts of light to be emitted from the light source to scan surfaces of different photosensitive members to different values as illustrated in FIG. 12, the Light amounts of beams reaching the surfaces of the different photosensitive members can be made equal to each other.

A semiconductor laser for use by an image forming apparatus typically performs automatic power control (APC) to keep optical output power constant. APC is a control scheme performed by monitoring an optical output power of a semiconductor laser with a photodetector and adjusting a forward current to be fed to the semiconductor laser to a desired value based on a detection signal representing a light-receiving current that is proportional to the optical power output of the semiconductor laser.

When the semiconductor laser is an edge-emitting semiconductor laser, a photodiode that monitors light traveling in a direction opposite to the direction, in which light exits the semiconductor laser toward the coupling lens, is typically used as the photodetector. However, when unnecessary ghost light enters the photodetector, the amount of light detected by the photodetector for use in APC undesirably increases.

For instance, in a position where a beam strikes a polygon mirror 7 at a 0-degree incident angle, a reflecting surface of the reflecting mirror directly faces the light source. If APC is performed in this position, a reflected beam returns to the light source, undesirably increasing the amount of light detected by the photodetector. In consideration of this, a configuration where APC is not performed when the incident angle is 0 degree is desirably employed. By employing this configuration, producing an image output of appropriate density with little inconsistencies in density can be attained.

As discussed above, in the second embodiment, The polygon mirror 7 is configured to be rotated by the drive motor clockwise about the rotation axis. Accordingly, the photosensitive members 11Y and 11M on the first side relative to the polygon mirror 7 are scanned in the main-scanning direction toward the light source, while the photosensitive members 11C and 11K on the second side are scanned in the main-scanning direction away from the light source.

Hence, in an arrangement where the scan-starting point is on the side away from the light source (the photosensitive members 11Y and 11M side), scanning light can be detected by placing the synchronization detector plate 10b including the synchronization detection sensor, such as a photodiode, outside the effective scan area on the scan-starting point side. However, in an arrangement where the scan-starting point is on the light source side (the photosensitive members 11C and 11K side), there is no appropriate space for arranging the synchronization detector plate because incident light is near the effective scan area.

In consideration of this, in the second embodiment, synchronization detection is performed by using a light beam reflected from the polygon mirror 7 to the incident-light mirror 6. More specifically, a light beam emitted from the semiconductor laser (light source) 1 illustrated in FIG. 7 passes through the coupling lens 3 and thereafter passes through the aperture member 12, through which the diameter of the light beam is adjusted. The light beam is then split by the half-mirror prism 4 into a light beam to be guided to the photosensitive member 11Y for yellow and a light beam to be guided to the photosensitive member 11K for black. The light beam to be guided to the photosensitive member 11K for black passes through The cylindrical lens 5b and, after being reflected from the incident-light mirror 6, impinges on the polygon mirror 7. When the light beam strikes the polygon mirror 7 at a 1-degree incident angle, the light returns to the incident-light mirror 6 by being reflected from the polygon mirror 7. The light beam, after being reflected from the incident-light mirror 6 again, enters the cylindrical lens 5b in a state of being shifted in the sub-scanning direction from the prior incidence and returns to the half-mirror prism 4.

The light beam that has entered the half-mirror prism 4 again is split by the half-mirror prism 4 into a Light beam directed to the semiconductor laser 1' side in a state of being shifted in the sub-scanning direction toward the light source and a light beam returning to the semiconductor laser 1 side. The light beam directed to the semiconductor laser 1' side travels toward a position, on the aperture member 12', displaced from a position of a light beam emitted from the semiconductor laser 1'. After being reflected from the reflecting surface on the Light shield of the aperture member 12' on the side away from the light source, the light beam impinges on the synchronization detector plate 10a. The aperture member 12' is arranged to be tilted in the main-scanning direction relative to the optical axis of the light beam emitted from the semiconductor laser 1'. With this arrangement, separating the light beam (incident light) emitted from the semiconductor laser 1' from the light beam (return Light) returned to the aperture member 12' and reflected from the reflecting surface of the light shield of the aperture member 12' to be subjected to the synchronization detection can be performed easily because the angle between the incident light and the return light is relatively large.

The width, in the main-scanning direction, of the light shield (outer frame portion) of the frame-shaped aperture member 12 is long only on the scanning lens 8b side. By virtue of this wide outer frame portion, a relatively large reflecting surface can be ensured, which allows a light beam to be reliably reflected to the synchronization detector plate 10a. The aperture member 12' can be configured such that the outer frame on the side away from the scanning lens 8b is narrow. This asymmetric shape of the outer frame of the aperture member 12' allows space saving, which leads to compact design of the optical scanning device.

The position where the synchronization detector plate 10a is arranged is displaced from a position, to which light (broken line in FIG. 7) that has impinged on the polygon mirror 7 at 0-degree incident angle returns. More specifically, in the second embodiment, synchronization detection is performed by utilizing return light that has impinged on the polygon mirror 7 at an incident angle of 1 degree, which slightly differs from 0 degree, rather than return light that has impinged on the polygon mirror 7 at a 0-degree incident angle.

The reason why, in the second embodiment, the synchronization detection is performed by utilizing return light that has impinged on the polygon mirror 7 at an incident angle of 1 degree, which slightly differs from 0 degree, rather than return light that has impinged on the polygon mirror 7 at a 0-degree incident angle is described below.

To perform synchronization detection for a light beam to be guided to the photosensitive member 11k for black by utilizing light that strikes the polygon mirror 7 at a 0-degree incident angle, it is necessary to use, of this light, reflected light reflected from a reflecting surface, of the reflecting surfaces of the polygon mirror 7, facing the scanning lens 8b. However, in the situation where the incident angle is 0 degree, reflected light reflected from another reflecting surface facing the scanning lens 8a also returns to the synchronization detector plate 10a simultaneously. This mechanism is described in detail below.

A light beam emitted from the light source 1 passes through the coupling lens 3 and thereafter passes through the aperture member 12, through which the diameter of the light beam is adjusted. The light beam is split by the half-mirror prism 4 into a light beam to be guided to the photosensitive member 11Y for yellow and a light beam to be guided to the photosensitive member 11K for black. The light beam guided to the photosensitive member 11K for black passes through the cylindrical lens 5b and, after being reflected from the incident-light mirror 6, impinges on the polygon mirror 7. The reflecting surface of the polygon mirror 7, on which the light beam impinges, is facing the scanning lens 8b.

Simultaneously, the light beam guided to the photosensitive member 11Y for yellow passes through the cylindrical lens 5a and, after being reflected from the incident-light mirror 6', impinges on the polygon mirror 7. The reflecting surface of the polygon mirror 7, on which the light beam impinges, is facing the scanning lens 8a.

When the incident angle is 0 degree, a light beam guided to the photosensitive member 11K for black and a light beam guided to the photosensitive member 11Y for yellow are reflected from the incident-light mirror 6 and the incident-light mirror 6', respectively, in a state of being shifted only in the sub-scanning direction relative to the incident light. Each of the reflected light beams enters a corresponding one of the cylindrical lenses 5a and 5b returns to the half-mirror prism 4. The light beams return to the same position on the half-mirror prism 4. Accordingly, of the light beams, resultant of splitting by the half-mirror prism 4, return light beams returning to the semiconductor laser 1 side also overlap on each other, while return light beams returning to the semiconductor laser 1' side also overlap on each other. More specifically, the light beam for black and the light beam for yellow return toward the synchronization detector plate 10a (broken line in FIG. 7) in a state of undesirably overlapping on each other.

Thus, when the incident angle is 0 degree, return light, a resultant of an incident light beam for black (returning from the surface of the polygon mirror 7 facing the scanning lens 8b) and return light, a resultant of an incident light beam for yellow (returning from the surface of the polygon mirror 7 facing the scanning lens 8a impinge on the synchronization detector plate 10a in a state of overlapping on each other. This prevents extraction of only reflected light reflected from, of the reflecting surfaces of the polygon mirror 7, the reflecting surface facing the scanning lens 8b; accordingly, the synchronization detection for black cannot be performed.

To that end, in the second embodiment, the incident angle on the polygon mirror 7 of the light beam for black to be used in the synchronization detection is set to 1 degree (while the incident angle of the light beam for yellow on the polygon mirror 7 is set to minus 1 degree). When the incident angle is thus shifted from 0 degree, the incident angle of a light beam returning to the incident-light mirror 6 for black and that of a light beam returning to the incident-light mirror 6' for yellow differ from each other. This causes the return light reflected from the incident-light mirror 6 and that from the incident-light mirror 6' to strike the half-mirror prism 4 at different positions in the main-scanning direction. Hence, the light beam for black can be separated from the light beam for yellow, making it possible to perform the synchronization detection for black by using the reflected light reflected from the reflecting surface facing the scanning lens 8b.

Figure 13:
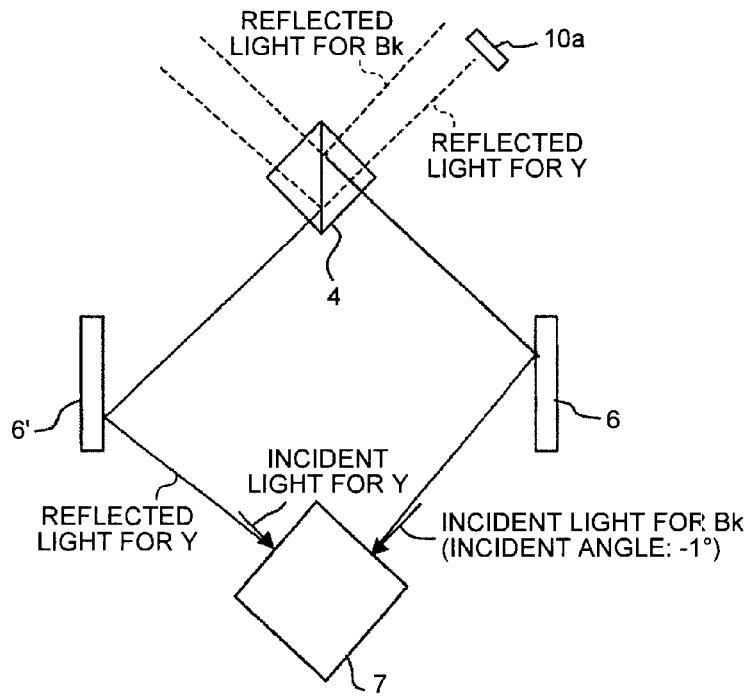
FIG. 13 is an explanatory diagram illustrating an example, in which an incident angle on the polygon mirror is set to minus 1 degree.

FIG. 13 illustrates, for supplementary explanation, an example situation where an incident angle of the light beam for black on the polygon mirror 7 is set to minus 1 degree. In this situation, an incident angle of light returning to the incident-light mirror 6 for black (Bk) and an incident angle of light returning to the incident-light mirror 6' for yellow (Y) differ from each other and the return light for yellow impinges on the synchronization detector plate 10a. Accordingly, when the incident angle on the polygon mirror 7 is thus set to minus 1 degree, the reflected light for black (Bk) cannot be successfully detected with the synchronization detector plate 10a, and hence the synchronization detection cannot be performed. Therefore, the incident angle of the light beam for black on the polygon mirror 7 is desirably set to minus 1 degree. When such settings are adopted, the light beam for yellow is prevented from striking the synchronization detector plate 10a because the incident angle of the light beam for yellow on the polygon mirror 7 is minus 1 degree. Hence, the synchronization detector plate 10a detects only the light beam for black.

In the second embodiment, as illustrated in FIG. 7, an aperture stop (another aperture member) 14 having an opening for separating return light rays is arranged upstream from the synchronization detector plate 10a. The aperture stop 14 inhibits the reflected light for yellow from entering the synchronization detector plate 10a; accordingly, only the reflected light reflected from the reflecting surface of the polygon mirror 7 facing the scanning lens 8b can be detected by the synchronization detector plate 10a.

In the second embodiment, a light-intensity reducing unit (e.g., a neutral density (ND) filter) 13 is provided at a position upstream from the synchronization detector plate 10b, which is provided at the scan-starting point on the side away from the light source. This synchronization detector plate 10b is used to determine when to start image writing on the photosensitive member 11Y for yellow, for instance. The light beam for yellow incident on the synchronization detector plate 10b is resultant of a light beam emitted from the light source 1 and subjected to splitting by the half-mirror prism 4 that splits the amount of light only once. Hence, the light beam for yellow incident on the synchronization detector plate 10b is relatively small in the amount of lost light.

In contrast, the light beam incident on the synchronization detector plate 10a, which is on the light source side, has been split once by the half-mirror prism 4 before the light beam strikes the polygon mirror 7. After being reflected from the polygon mirror 7, the light beam further passes through the incident-light mirror 6' and the cylindrical lens 5b, and strikes the half-mirror prism 4 again. Hence, the light amount of the light beam has been split by the half-mirror prism 4 twice. Accordingly, the amount of light incident on the synchronization detector plate 10b arranged at the scan-starting point on the side away from the light source is relatively large because the number of times the light beam has been split is smaller by one than that of the light beam incident on the synchronization detector plate 10a. This relative difference in the amount of light can be still larger because the diameter of the light ray reflected from the reflecting surface on the light shield of the aperture member 12' is reduced by the aperture member 12'.

In consideration of this, in the second embodiment, the ND filter 13, serving as the light-intensity reducing unit, is provided at the position upstream from the synchronization detector plate 10b that is provided at the scan-starting point on the side away from the light source to reduce the amount of light entering the synchronization detector plate 10b so that the light amount is equal to the amount of light entering the synchronization detector plate 10a arranged on the light source side. This leads to accurate synchronization detection.

The embodiments has been discussed by way of the example where the synchronization detection is performed for scanning of the photosensitive member 11Y for yellow and the photosensitive member 11K for black. Synchronization detection for scanning of the photosensitive member 11M for magenta and the photosensitive member 11C for cyan can be performed in a similar manner.

According to an aspect of the present invention, a higher degree of freedom of layout on a side where scanning is started can be attained because synchronization detection can be performed at a position away from a scanning lens, which is arranged near the light source. Accordingly, even when the angle of view becomes wider, sufficient space can be ensured for synchronization detection.

Although the invention has been described with respect to specific embodiments for a complete and clear disclosure, the appended claims are not to be thus limited but are to be construed as embodying all examples and alternative constructions that may occur to one skilled in the art that fairly fall within the basic teaching herein set forth.

What is claimed is:
1. An optical scanning device comprising:
   a light source that emits light rays;
   a cylindrical lens that condenses the light rays in a sub-scanning direction;
   an aperture member that adjusts a diameter of the light rays, the aperture member including a frame and an aperture through the frame, and the aperture member being arranged between the light source and the cylindrical member;
   a deflector including a plurality of reflecting surfaces that deflect the light rays;
   a scanning optical system that guides a light ray, of the light rays incident on the deflector and deflected by the deflector so as to be subjected to scanning onto a to-be-scanned surface; and
   a synchronization detector that receives a light ray of the light rays and performs synchronization using the light ray received,
   wherein the light ray that is received by the synchronization detector is a light ray reflected from the deflector to the frame of the aperture member and then reflected from the frame of the aperture member to the synchronization detector, and
   wherein the aperture member is tilted in a main-scanning direction with respect to an axis perpendicular to an optical axis such that a portion, of the aperture member, corresponding to the synchronization detector is away from the synchronization detector.

2. The optical scanning device of claim 1, wherein a center of the aperture is shifted from a center of the aperture member in a main-scanning direction.

3. The optical scanning device of claim 1, wherein the aperture member has a first surface on a side of the light source and a second surface on a side of the deflector, a reflectance of the first surface being smaller than a reflectance of the second surface.

4. The optical scanning device of claim 1, wherein the light source is a surface-emitting laser.

5. The optical scanning device of claim 1, further comprising a member, in which an opening for separating the return light ray is provided, arranged at a position in front of upstream from the synchronization detector.

6. An image forming apparatus for forming an image on a recording medium, the image forming apparatus comprising:
   the optical scanning device according to claim 1, the optical scanning device forming a latent image by illuminating an image carrier, the image carrier being the to-be-scanned surface, with the beams emitted from the light source; and
   a developing unit where the latent image formed on the image carrier is developed with developing agent into a developed image,
   wherein the developed image is transferred onto the recording medium by any one of direct transfer and an indirect transfer via an intermediate transfer member.

7. The optical scanning device of claim 1, the optical scanning device further comprising a light-supplying optical system including:
   a beam splitter for splitting each of the light rays into two light rays directed in different directions, the beam splitter being provided at a position between the aperture member and the deflector; and
   incident-light mirrors for causing the two light rays split by the beam splitter to impinge on the deflector in a manner that an angle between the two light rays incident on the deflector is approximately $\pi/2$.

8. The optical scanning device of claim 7, wherein the light rays emitted from the light source pass through the aperture,
   wherein the frame is a light shield surrounding the aperture, and
   wherein a surface, on a side of the deflector, of the light shield is a reflecting surface.

9. The optical scanning device of claim 7, wherein
   the beam splitter includes a half mirror,
   the light source includes a first light source arranged on a first substrate and a second light source arranged on a second substrate, the first substrate and the second substrate being mutually independent, and
   an angle, on an incident surface of the half mirror, between a light ray emitted from the first light source and a light ray emitted from the second light source is $\pi/2$.

10. The optical scanning device of claim 7, further comprising:
   another synchronization detector arranged on a side away from the light source; and
   a light-intensity reducing unit arranged at a position upstream from the another synchronization detector.

11. An image forming apparatus for forming an image on a recording medium, the image forming apparatus comprising the optical scanning device according to claim 7, wherein
the optical scanning device forms a latent image by illuminating an image carrier, the image carrier being the to-be-scanned surface, with the beams emitted from the light source,
the latent image formed on the image carrier is developed with developing agent into a developed image, and
the developed image is transferred onto the recording medium by any one of direct transfer and an indirect transfer via an intermediate transfer member.

12. The optical scanning device of claim 1, wherein a first portion of the frame of the aperture member that abuts a first side of the aperture is wider than a second portion of the frame of the aperture member that abuts a second side of the aperture, the second side being opposite the first side, the light ray that is received by the synchronization detector being a light ray reflected from the first portion of the frame of the aperture member to the synchronization detector.

13. An optical scanning device comprising:
a light source that emits light rays;
a cylindrical lens that condenses the light rays in a sub-scanning direction;
an aperture member that adjusts a diameter of the light rays, the aperture member including a frame and an aperture through the frame, and the aperture member being arranged between the light source and the cylindrical member;
a deflector including a plurality of reflecting surfaces that deflect the light rays;
a scanning optical system that guides a light ray, of the light rays incident on the deflector and deflected by the deflector so as to be subjected to scanning onto a to-be-scanned surface;
a light-supplying optical system including
a beam splitter for splitting each of the light rays into two light rays directed in different directions, the beam splitter being provided at a position between the aperture member and the deflector, and
incident-light mirrors for causing the two light rays split by the beam splitter to impinge on the deflector in a manner that an angle between the two light rays incident on the deflector is approximately $\pi/2$; and
a synchronization detector that receives a light ray of the light rays and performs synchronization using the light ray received,
wherein the light ray that is received by the synchronization detector is a light ray reflected from the deflector to the frame of the aperture member and then reflected from the frame of the aperture member to the synchronization detector.

14. The optical scanning device of claim 13, wherein a center of the aperture is shifted from a center of the aperture member in a main-scanning direction.

15. The optical scanning device of claim 13, wherein the aperture member has a first surface on a side of the light source and a second surface on a side of the deflector, a reflectance of the first surface being smaller than a reflectance of the second surface.

16. The optical scanning device of claim 13, wherein the light source is a surface-emitting laser.

17. The optical scanning device of claim 13, further comprising a member, in which an opening for separating the return light ray is provided, arranged at a position in front of upstream from the synchronization detector.

18. An image forming apparatus for forming an image on a recording medium, the image forming apparatus comprising:
the optical scanning device according to claim 13, the optical scanning device forming a latent image by illuminating an image carrier, the image carrier being the to-be-scanned surface, with the beams emitted from the light source; and
a developing unit where the latent image formed on the image carrier is developed with developing agent into a developed image,
wherein the developed image is transferred onto the recording medium by any one of direct transfer and an indirect transfer via an intermediate transfer member.

19. The optical scanning device of claim 13, wherein the light rays emitted from the light source pass through the aperture,
wherein the frame is a light shield surrounding the aperture, and
wherein a surface, on a side of the deflector, of the light shield is a reflecting surface.

20. The optical scanning device of claim 13, wherein
the beam splitter includes a half mirror,
the light source includes a first light source arranged on a first substrate and a second light source arranged on a second substrate, the first substrate and the second substrate being mutually independent, and
an angle, on an incident surface of the half mirror, between a light ray emitted from the first light source and a light ray emitted from the second light source is $\pi/2$.

21. The optical scanning device of claim 13, further comprising:
another synchronization detector arranged on a side away from the light source; and
a light-intensity reducing unit arranged at a position upstream from the another synchronization detector.

22. An image forming apparatus for forming an image on a recording medium, the image forming apparatus comprising the optical scanning device according to claim 13, wherein
the optical scanning device forms a latent image by illuminating an image carrier, the image carrier being the to-be-scanned surface, with the beams emitted from the light source,
the latent image formed on the image carrier is developed with developing agent into a developed image, and
the developed image is transferred onto the recording medium by any one of direct transfer and an indirect transfer via an intermediate transfer member.

23. The optical scanning device of claim 13, wherein a first portion of the frame of the aperture member that abuts a first side of the aperture is wider than a second portion of the frame of the aperture member that abuts a second side of the aperture, the second side being opposite the first side, the light ray that is received by the synchronization detector being a light ray reflected from the first portion of the frame of the aperture member to the synchronization detector.

* * * * *